July 23, 1940.  O. SHERER  2,209,096

ARTIFICIAL BAIT

Filed July 11, 1938

Inventor:
Osborn Sherer

Patented July 23, 1940

2,209,096

UNITED STATES PATENT OFFICE 2,209,096

ARTIFICIAL BAIT

Osborn Sherer, Paxton, Mass., assignor to Josephine W. Sherer, Paxton, Mass., doing business as The Oletime Woodsman's Line Application July 11, 1938, Serial No. 218,567

2 Claims. (Cl. 43—48)

The present invention relates to the construction of artificial "flies," either of the wet type or the dry type, which are used in casting for salmon, trout, and other fish.

In general, the practice in the manufacture of such flies is to assemble in fanned-out relation along the shank of the hook the several colored feathers, streamers, threads, etc., that simulate the body and wings of the insect or bait, so as to conceal or partly conceal the point of the hook; at the other end of the hook, the inner or forward ends of these elongated feathers, streamers, etc., are usually flanked by a pair of relatively short feathers exhibiting spots or bands of brilliant contrasting colors; these are called "eye" feathers, because of the simulation of the insect's eyes by the light-colored spots or bands near their forward or inner ends; ordinarily, said inner or forward ends are secured to the shank by the same tying or binding which holds in place the forward ends of the long feathers, streamers, etc., of the fly.

These two short "eye" feathers, arranged exteriorly of the streamers, on opposite sides of the shank near the head portion of the fly, are important and essential elements of every properly-fabricated artificial fly; it is a requisite of such "eye" feathers that they should present in appropriate spots or zones, two or more sharply-contrasting colors, by which to simulate more closely the appearance of the head of the natural insect. These special color requirements for "eye" feathers can be met by the feathers of only a very few species of birds; for example, a widely used source of "eye" feathers are the breast feathers of the jungle cock whose habitat is India, and it is well known that the relative scarcity of these and other natural feathers having the appropriate size, texture and coloration for use as "eye" feathers in artificial fly manufacture, has been largely responsible for the high cost of the better-grade artificial flies employing properly-selected "eye" feathers.

An object of my invention is to overcome, in artificial fly manufacture, this handicap resulting from the scarcity and high cost of natural "eye" feathers. According to my invention, as hereinafter more fully described in detail, these flanking natural "eye" feathers in each artificial fly are replaced by a pair of members closely simulating said feathers in size, shape, coloration and texture, but which are more durable than said "eye" feathers, and obtainable at far less cost. Other and further objects and advantages of my invention will be made apparent from the following detailed description thereof, reference being had in this connection to the accompanying drawing, wherein—

Fig. 3 illustrates also in enlarged scale the manner of producing the members of Fig. 2 from suitably-colored sheet material such as Celluloid or the like.

Like reference characters refer to like parts in the different figures.

Figure 1:
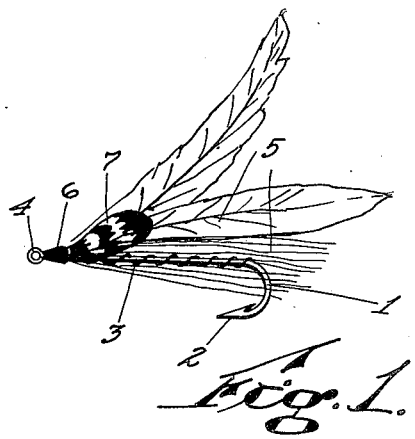
Fig. 1 is a view in side elevation showing an artificial fly having a construction in accordance with my invention.

The artificial fly shown for illustrative purposes in Fig. 1 comprises the usual hook 1, with a point or barb 2 at its rear end. The shank 3 of said hook provides at its forward end the usual loop 4 for attachment of the leader or line, not shown. Arranged along the shank 3 is the usual cluster 5 of relatively elongated feathers, strands, streamers, and the like, whose forward ends, just behind the loop 4, are securely fastened to the shank by a tie 6, which may consist, as is customary, of a thread which is tightly wrapt or wound for several turns around the shank and is usually coated with a suitable waterproof enamel.

Heretofore in the manufacture of such a fly, it has been the practice before application of the tie 6 to assemble with the cluster 5, on opposite sides thereof, a pair of carefully-selected, matching, relatively-short "eye" feathers, either of the jungle cock variety above mentioned, or of some other variety of natural species that presents to the desired degree the contracting color spots which simulate the insect's appearance at the "eye" or head end; it has been the general practice to apply the tie 6 not only to the cluster 5, but also to the forward ends of these "eye" feathers, the latter's rearwardly extending portions serving in the completed fly structure to confine and incase for a short distance the more pliant and wavy strands or streamers of the cluster 5. Such natural "eye" feathers of the desired coloration are not only of relatively rare occurrence and therefore expensive to procure, but also, in the average fly, are subjected by their environment to relatively hard usage which causes them not infrequently to split longitudinally and thereby to lose, in part at least, their effectiveness not only from the standpoint of appearance, but also from the standpoint of effectually confining the strands and streamers of the cluster 5.

Figure 2:
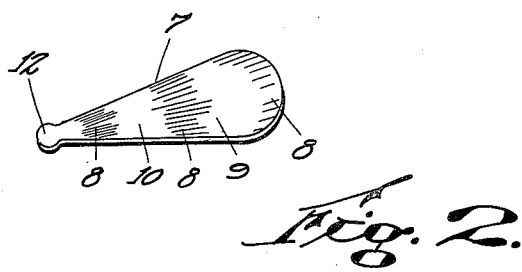
Fig. 2 is a larger scale perspective view, showing one of the pair of flanking members employed to provide the "eye" or head portion of the fly shown in Fig. 1.
Figure 3:
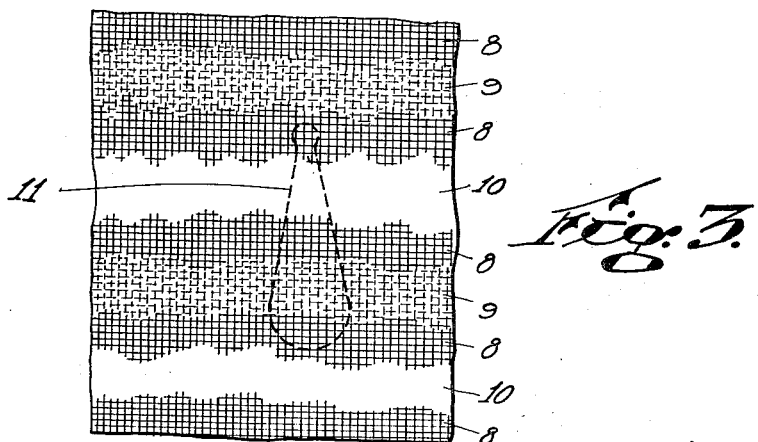

According to my invention, these natural "eye" feathers in the completed fly structure are replaced by a pair of flanking members 7, 7 (only one being shown in Fig. 1), which in shape, size and coloration are practically indistinguishable from the natural "eye" feathers themselves. Said members 7, 7 are of thin sheet material, which is preferably water-proof, or so treated as to be water-resistant, thereby to suffer no impairment of its inherent strength and stiffness when the fly is in use. I have discovered that Celluloid, in thin sheet form, is especially suitable as a material for such members,—it being possible in the manufacture of such material to introduce permanent coloring agents in such a manner as to obtain in the finished sheet (see Fig. 3) a series of narrow irregularly-outlined bands or zones of contrasting colors at 8, 9 and 10 in a repeating pattern, transversely of the sheet. Instead of Celluloid, I may use as the material of the sheet, (Fig. 3), a water-proof parchment, or a rubber composition or even a woven textile material; in such cases the irregular bands or zones 8, 9 and 10 in contrasting colors would be printed, or lithographed, and then the sheet would be coated, and stiffened if need be, by applications thereto of a suitable water-proof lacquer. In any case, by means of a suitable die or cutter, whose outline is shown by the broken lines 11, it is possible to cut from said sheet (Fig. 3) a series of members 7, 7, each substantially of the appearance and form depicted in Fig. 2, and with the desired coloration closely simulating the natural "eye" feathers that present their spots in sharply contrasting colors. Each member 7, at its narrow or contracted end where the tie or binding 6 of the fly is applied, is shaped to provide a knob-like portion 12, thus to form on said member's edge a notch or shoulder which serves as a means of engagement with the thread of the tie 6 to hold said member more firmly against displacement on the shank of the hook.

In the completed fly of my invention using the pair of sheet-material colored members in place of natural "eye" feathers, there is no sacrifice of effectiveness of the lure, since the permanent coloration of said members 7, 7 can be made to duplicate exactly the coloration of the natural "eye" feathers used in any artificial fly. On the other hand, the cost of the fly is very materially reduced, and its life and durability is very measurably increased, since the members 7, 7 are entirely unaffected by repeated exposures to water and are much stronger structurally than the "eye" feathers which they simulate,—having no tendency to split or to become misplaced on the shank of the hook.

I am aware that it has been proposed heretofore, in artificial bait manufacture, to employ strips of colored Celluloid and like materials, in simulation of insect wings; I make no claim to any such use of colored strips of Celluloid or like material in an artificial fly, but what I do claim and desire to secure by Letters Patent is as follows:

1. As a new article of manufacture, a member of synthetic material having the coloration and shape of an "eye" feather for an artificial "fly," said member at its smaller end providing a knob or enlargement which is engaged by the thread employed as a tie in the assembly of said "fly."

2. As a new article of manufacture, a member of thin sheet material, having the shape and coloration of an "eye" feather for an artificial "fly," said member at its smaller end being shaped to provide a notch or shoulder on its edge, for engagement by the thread employed as a tie in the assembly of said "fly."

OSBORN SHERER.